(12) United States Patent
Ichizaki

(10) Patent No.: US 7,876,005 B2
(45) Date of Patent: Jan. 25, 2011

(54) MOTOR

(75) Inventor: Hiroyuki Ichizaki, Kyoto (JP)

(73) Assignee: Nidec Corporation, Kyoto (JP)

( * ) Notice: Subject to any disclaimer, the term of this patent is extended or adjusted under 35 U.S.C. 154(b) by 300 days.

(21) Appl. No.: 12/019,057

(22) Filed: Jan. 24, 2008

(65) Prior Publication Data

US 2008/0179978 A1 Jul. 31, 2008

(30) Foreign Application Priority Data

Jan. 25, 2007 (JP) .............................. 2007-014565

(51) Int. Cl.
*H02K 5/167* (2006.01)
*G11B 17/028* (2006.01)

(52) U.S. Cl. .................... 310/67 R; 310/91; 360/98.07; 360/99.07; 360/99.08

(58) Field of Classification Search .............. 310/67 R, 310/89, 91; 360/98.07, 99.04, 99.07–99.08
See application file for complete search history.

(56) References Cited

U.S. PATENT DOCUMENTS

| 6,806,601 | B2 * | 10/2004 | Miyamoto | 310/68 B |
| 6,826,771 | B1 * | 11/2004 | Wada | 720/707 |
| 2007/0278880 | A1 * | 12/2007 | Wada et al. | 310/90 |

FOREIGN PATENT DOCUMENTS

| JP | 01017277 A | * | 1/1989 |
| JP | 2000123466 A | * | 4/2000 |
| JP | 2002051495 A | * | 2/2002 |
| JP | 2003-032932 A | | 1/2003 |
| JP | 2005253239 A | * | 9/2005 |
| JP | 2005-354757 A | | 12/2005 |
| JP | 2006196139 A | * | 7/2006 |

OTHER PUBLICATIONS

Takaki et al., "Chucking Mechanism, Motor Having the Same, and Method of Manufacturing the Same", U.S. Appl. No. 11/819,559, filed Jun. 28, 2007.

Iwai et al., "Brushless Motor, and Disk Drive Equipped With the Same", U.S. Appl. No. 11/866,721, filed Oct. 3, 2007.

* cited by examiner

*Primary Examiner*—Tran N Nguyen
(74) *Attorney, Agent, or Firm*—Keating & Bennett, LLP

(57) ABSTRACT

In a motor, a retaining claw with a slanted surface is arranged around the upper end of a tubular portion of a housing for mounting a rotor. A cylindrical portion is integrally formed in a peripheral area of a rotational axis of a turntable. A retaining member with retaining portions having a J-shaped cross section is attached to the lower surface of the turntable. Arms of the retaining portions are located in the vicinity of the lower end of the cylindrical portion. In mounting the rotor onto the housing, the retaining portions contact the slanted surface and the arms are elastically deformed. Upon completion of the mounting, the arms return to a state before the elastic deformation, so that the retaining claw prevents the rotor from coming off.

17 Claims, 12 Drawing Sheets

MOTOR

BACKGROUND OF THE INVENTION

1. Field of the Invention

The present invention relates to a brushless motor to be mounted in a data storage medium drive for a data storage medium such as an optical data storage medium. More particularly, the present invention relates to an improvement in a rotor retaining mechanism in association with a thickness reduction of the brushless motor.

2. Description of the Related Art

Strenuous efforts are being made to reduce the size and weight of personal computers, which are mainly used as portable computers, in order to improve portability thereof. Coupled therewith, thickness reduction to an utmost limit is required of the data storage medium drives used for storing and retrieving data stored in a data storage medium (e.g., optical data storage medium) mounted in the personal computers. Also, thickness reduction is required of the spindle motors (hereafter, motors) mounted in the data storage medium drives.

Conventionally, a ball chuck system is used as a method for holding a data storage medium in a data storage medium drive. The ball chuck system provides the data storage medium with a holding strength of about 300 gf or greater; hence, when a user pulls the data storage medium up in order to remove the medium from the spindle motor, the rotor of the spindle motor may be lifted together with the data storage medium. For this reason, the spindle motor includes a rotor retaining mechanism preventing the rotor from being separated from other components of the spindle motor.

Conventionally, the rotor retaining mechanism includes a shaft retaining type and a hook-shaped type.

A conventional retaining mechanism will be described with reference to FIGS. 9 and 10. FIGS. 9 and 10 show schematic cross-sectional views taken along an axial direction of spindle motors mounted in data storage medium drives. FIG. 9 shows a retaining mechanism of the shaft retaining type, and FIG. 10 shows a retaining mechanism of the hook-shaped type.

The common structure of the spindle motors shown in FIGS. 9 and 10 includes a rotor 100 on which a data storage medium such as a compact disk is mounted in a removable manner, a bearing portion 101 for rotatably supporting the rotor 100, and a housing 102.

The rotor 100 has a substantially circular disk-shaped turntable 103 for placing the data storage medium on its upper surface, a chucking device 104 fitted on the upper surface of the turntable 103 for removably holding the data storage medium, a shaft 105 attached integrally with the turntable 103, and a rotor magnet 106.

Inside the housing 102 that is attached on an attachment plate 107, the bearing portion 101 is fixed for rotatably supporting the shaft 105. A stator 108 is fixed at the upper outer side of the housing 102. The stator 108 is disposed opposite the rotor magnet 106 with a gap in between to produce a rotational magnetic field for rotatably driving the rotor 100. A pressurizing magnet 109 is disposed between the turntable 103 and the housing 102 provided with other components. The pressurizing magnet 109 magnetically attracts the turntable 103 to the side of the housing 102, so that the turntable 103 can be stably rotated.

The rotor 100 is mounted onto the housing 102 provided with other components with the shaft 105 inserted into the bearing portion 101, for example. In order to prevent the mounted rotor 100 from coming off, a rotor retaining mechanism is provided.

As shown in FIG. 9, a rotor retaining mechanism of the shaft retaining type is defined by a groove 110 encircling the whole circumference of a lower end portion of the shaft 105 of the rotor 100, and a retaining member 113 fixed on the housing 102 with its tip 111 positioned inside the groove 110. As the shaft 105 moves upward, the lower inner surface 114 in the groove 110 comes into contact with the tip 111 of the retaining member 113 before the rotor 100 comes off the other components. In this way, the retaining mechanism of the shaft retaining type prevents the rotor 100 from coming off.

The retaining mechanism of the shaft retaining type, however, requires extension of the shaft 105 so as to provide the groove 110 on the lower end side of the shaft 105. The thickness of the spindle motor is inevitably increased by the extended length of the shaft 105. It is, therefore, difficult to reduce the thickness of the data storage medium drive with this structure.

A retaining mechanism of the hook-shaped type includes a retaining member 121 having a spring arm 120 with a tip hook-shaped in cross section, as shown in FIG. 10. The retaining member 121 is attached to the lower surface of the turntable 103 of the rotor 100 with the spring arm 120 projected toward the housing 102. Then, a rotor retaining mechanism 122 is disposed at the top of a tubular portion of the housing 102 inside the spindle motor, with due attention to the length of the shaft not to be shortened. The retaining mechanism of the hook-shaped type thus enables reduction in thickness of the data storage medium drive while maintaining the rotational stability of the rotor, as compared with the retaining mechanism of the shaft retaining type.

If, however, the thickness of the data storage medium drive shall be further reduced, the thickness of the turntable 103 must be reduced. Consequently, the rigidity of the turntable 103 is lowered. In this case, even with the retaining mechanism of the hook-shape type, there arises a problem of possible deformation of the turntable 103 attached with the retaining member 121, e.g., during the assembly of the spindle motor, due to an external impact, or upon the load applied at the attachment or removal of the data storage medium. In order to ensure the rotational accuracy of the data storage medium, the deformation of the turntable 103 must be avoided.

SUMMARY OF THE INVENTION

In order to overcome the problems described above, preferred embodiments of the present invention provide a motor including a rotor, a bearing portion, and a housing. The rotor has a shaft as an axis of rotation (hereafter, "rotational axis"), a rotor magnet that is rotated integrally with the shaft, and a turntable that retains the rotor magnet. The bearing portion having a substantially cylindrical shape rotatably supports the shaft. The housing has a tubular portion with an inner surface for holding the bearing portion.

The housing of the motor according to a preferred embodiment of the present invention has a retaining claw that protrudes radially outward on the upper outer surface of the tubular portion. A retaining member is fixed on the lower surface of a lid portion of the turntable. The retaining member comes into contact with the retaining claw so that the movement of the turntable is restricted in the axially upward direction relative to the housing. The retaining member has a planar attachment base and a plurality of retaining portions. The attachment base is fixed on the lower surface of the lid portion, and the plurality of retaining portions are arranged integrally with the attachment base. Each retaining portion is arranged with an arm projecting axially downward, and a catching portion which is arranged at the lower side of the arm and comes into contact with the retaining claw. Note that the retaining member is fixed in the inner peripheral edge of the lid portion.

In the motor according to a preferred embodiment of the present invention, the retaining claw of the housing is arranged with a slanted surface that slants axially downward to the radially outer side. The slanted surface contacts the retaining member while the rotor is being mounted to the housing.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
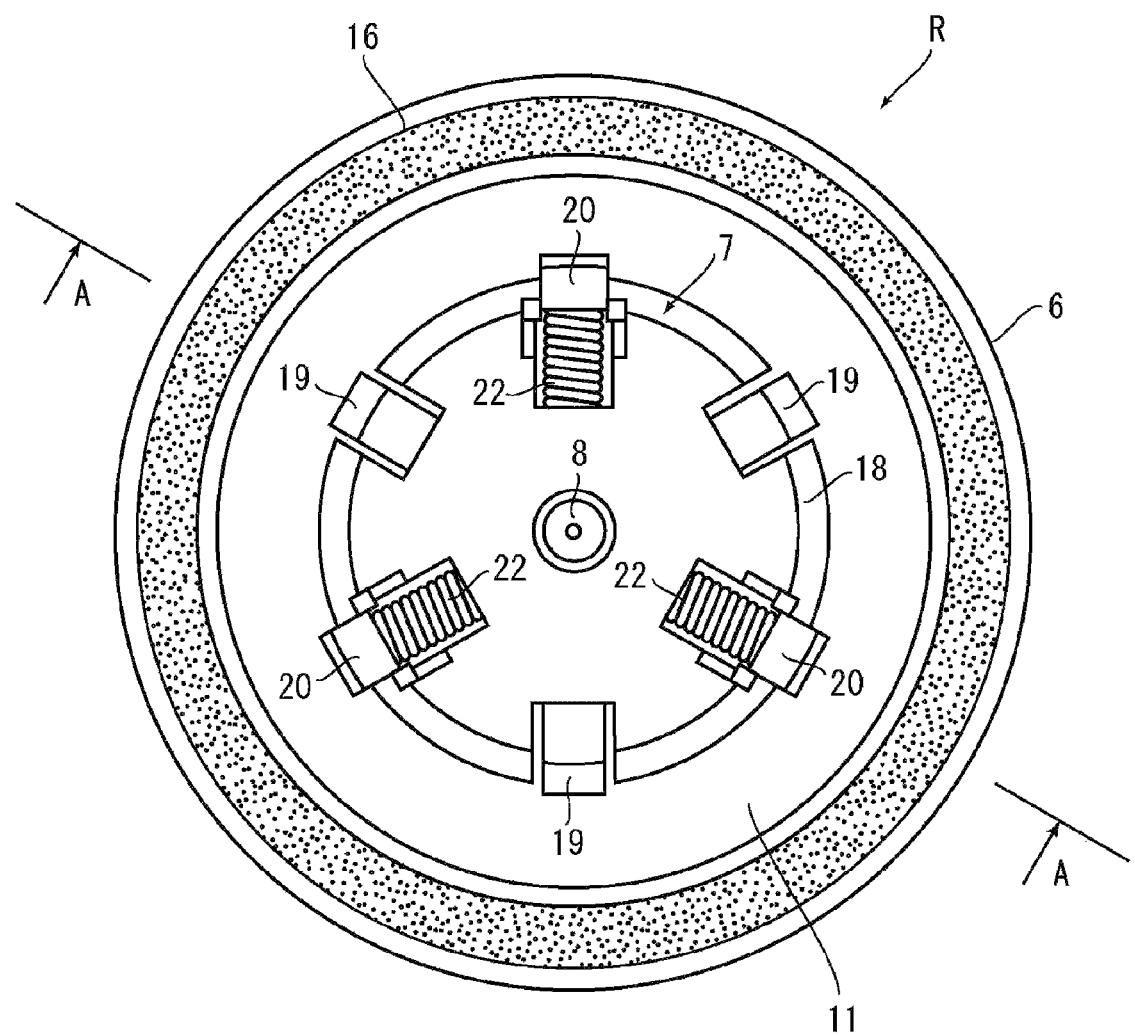
FIG. 1 is a schematic plan view of a motor according to a preferred embodiment of the present invention when viewed from above.

Referring to FIGS. 1 through 8, preferred embodiments of the present invention will be described in detail. It should be noted that in the explanation of the preferred embodiments of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a rotation axis, and a radial direction indicates a direction perpendicular to the rotation axis.

Figure 2:
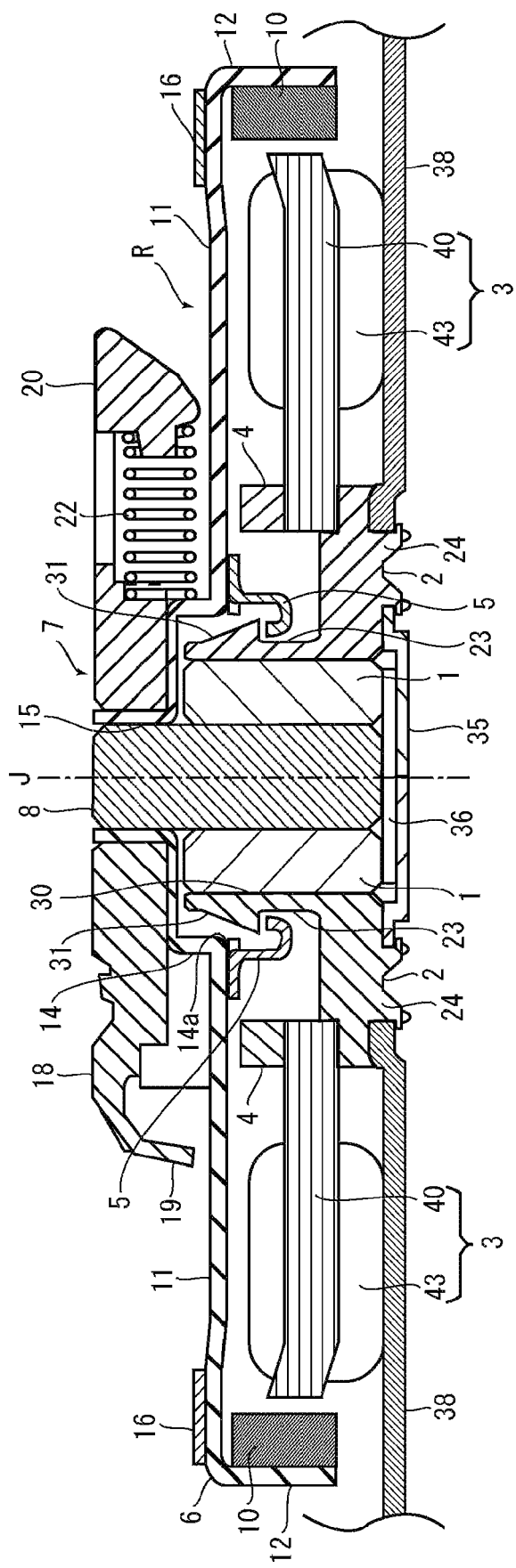
FIG. 2 is a cross-sectional view taken along the line A-A of FIG. 1.

Preferred embodiments of the present invention will be described below with reference to the accompanying drawings. FIGS. 1 and 2 illustrate a spindle motor for a data storage medium drive as an exemplary motor according to a preferred embodiment of the present invention. FIG. 1 is a schematic plan view of the spindle motor when viewed from above, and FIG. 2 is a cross-sectional view taken along the line A-A of FIG. 1. As for the size of the spindle motor, a rotor R in FIG. 1 is preferably about 30 mm in diameter, for example. The axial height from the lower surface of an attachment plate 38 to the upper surface of a chucking device 7 in FIG. 2 is preferably about 5.3 mm, for example. The axial height from the lower surface of the attachment plate 38 to the upper surface of a turntable 6 is preferably about 3 mm, for example. The spindle motor can be suitably used in a thin data storage medium drive of about 9.5 mm or less, especially about 7 mm, in height, for example.

The spindle motor preferably includes the rotor R, a bearing portion 1, a housing 2, a stator 3, a pressurizing magnet 4, and a retaining member 5. The rotor R allows placement of an optical data storage medium such as a data storage medium (e.g., compact disk) to rotate the same. The bearing portion 1 supports the rotor R in a rotatable manner about a rotational axis J.

The rotor R preferably includes the turntable 6, the chucking device 7, a shaft 8, and a rotor magnet 10. The turntable 6 preferably has a substantially circular disk shape. The chucking device 7 at which a storage medium is detachably set is preferably fitted at a substantially center on the upper side of the turntable 6 (i.e., radially inwardly of a data storage medium supporting member which is described below). The shaft 8 is attached at the center of the turntable 6 to extend along the axial direction. The rotor magnet 10 is attached to a portion in the outer periphery of the turntable 6.

Figure 9:
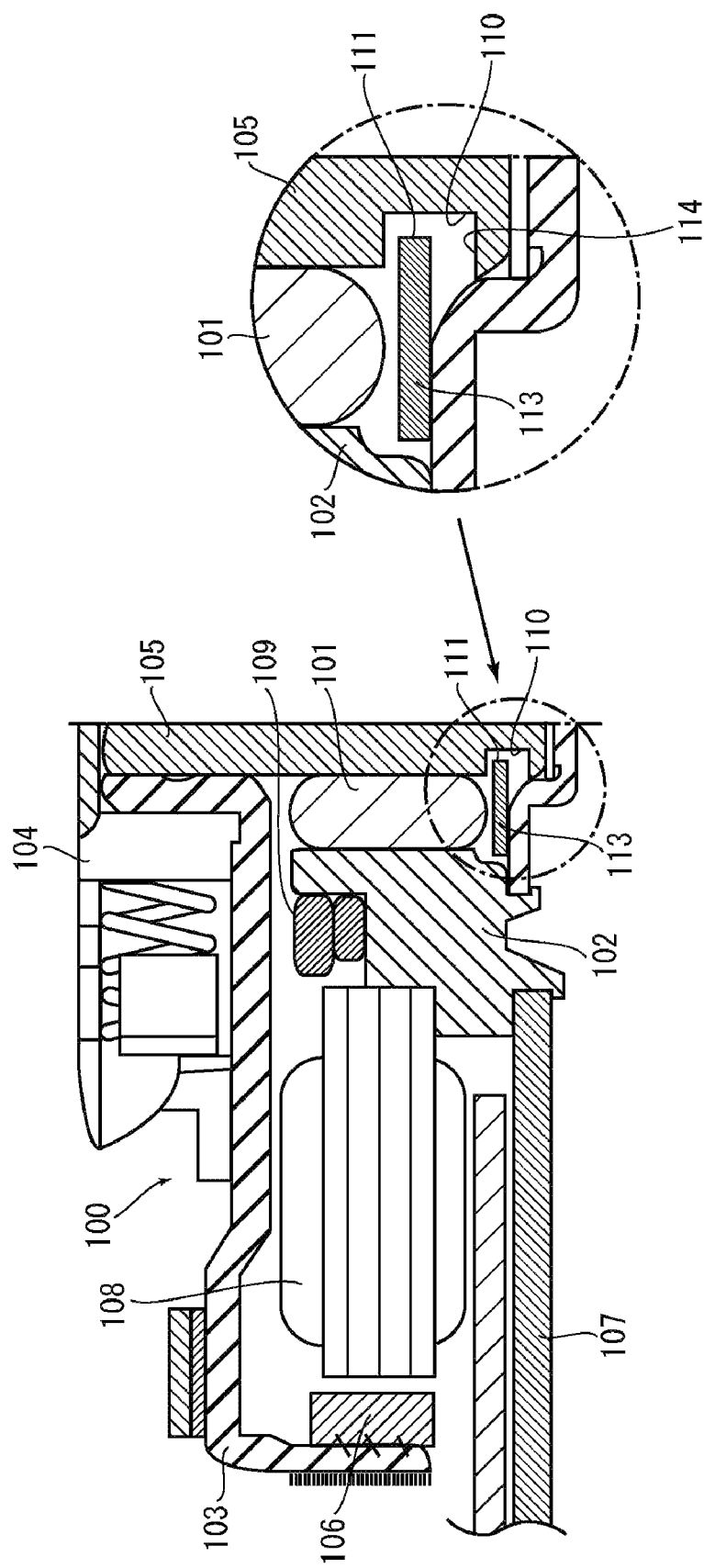
FIG. 9 is a schematic half sectional view of a conventional motor taken along an axial direction, along with an enlarged view encircled with an alternate long and short dash line showing an example of a conventional rotor retaining mechanism.
Figure 10:
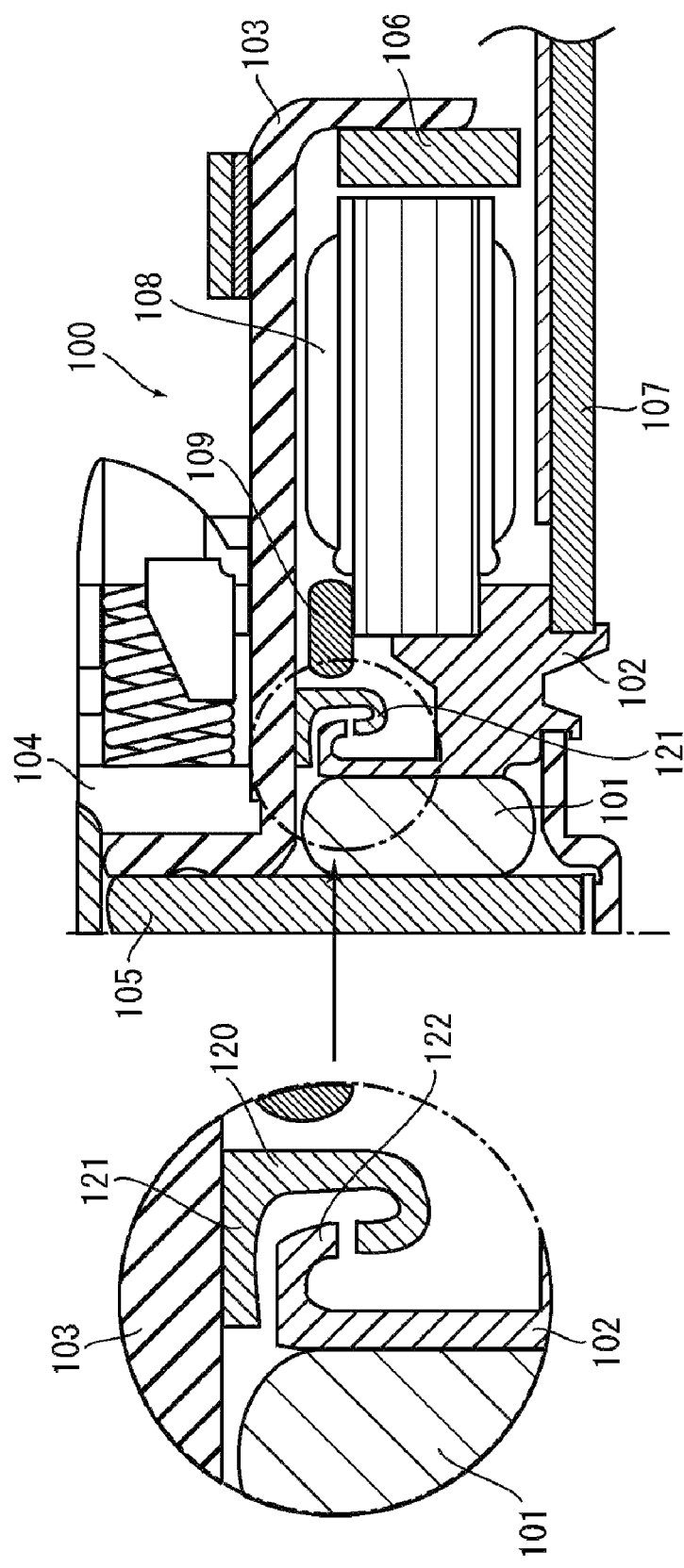
FIG. 10 is a schematic half sectional view of a conventional motor taken along the axial direction, along with an enlarged view encircled with an alternate long and short dash line showing another example of the conventional rotor retaining mechanism.

The turntable 6 is an integrally-formed product preferably formed by bending a magnetic steel plate such as a galvanized sheet iron through press working. The thickness of the steel plate that forms the turntable 6 preferably is, e.g., about 0.4 mm, for example. For reference sake, a steel plate of 0.8 mm in thickness is typically used in the motor utilizing the retaining mechanism of the shaft retaining type shown in FIG. 9, and a steel plate of 0.6 mm in thickness is typically used in the motor utilizing the retaining mechanism of the hook-shaped type shown in FIG. 10.

Nitriding treatment is preferably performed on the turntable 6. The nitriding treatment is a method for hardening a steel plate, including infusing nitrogen from the surface of the steel plate and spreading the same to form a nitrogen-concentrated layer over the superficial portion. That is, the surface of the turntable 6 is covered with a nitriding layer. The turntable thus treated is improved in rigidity in comparison to an untreated one having the same thickness. As a result, it is possible to minimize the deformation of turntable, and hence to further reduce the thickness of the turntable.

The turntable 6 preferably includes a substantially circular disk-shaped lid portion 11, a peripheral wall 12, and a substantially cylindrical portion 14. The lid portion 11 has its outer peripheral portion bent annularly and slightly raised. The peripheral wall 12 is extended downward from the outer peripheral edge of the lid portion 11. The cylindrical portion 14 is arranged axially upward from the inner peripheral edge of the lid portion 11. The cylindrical portion 14 has an upper wall continuing from the upper peripheral edge of the cylindrical portion 14. A shaft fixing portion 15 is preferably arranged in a protruding manner from a central portion of the upper wall. The shaft fixing portion 15 has a substantially cylindrical shape with a diameter smaller than that of the cylindrical portion 14. The shaft fixing portion 15 opens at the upper end. That is, the shaft fixing portion 15 penetrates the turntable 6 in the axial direction.

More specifically, a portion surrounding the rotational axis at the inner peripheral edge of the lid portion 11 is arranged with the cylindrical portion 14 and the shaft fixing portion 15 on the axially upper side. The cylindrical portion 14 and the shaft fixing portion 15 are preferably formed by depressing the steel plate in a multistage structure through press working. A bent portion 14a linking to the lid portion 11 at the lower end of the cylindrical portion 14 and a bent portion linking to the upper wall of the cylindrical portion 14 at the lower end of the shaft fixing portion 15 are both bent at a substantially right angle.

In addition, the turntable 6 is further prevented from being deformed by the annularly-bent outer peripheral portion of the lid portion 11 of the turntable 6 in cooperation with the bent structure of the portion surrounding the rotational axis.

The axes J of the turntable 6, the cylindrical portion 14, and the shaft fixing portion 15 are all coincident with the rotational axis of the rotor R. Attached to the upper surface of the turntable 6 at the outer peripheral edge of the lid portion is a data storage medium supporting member 16 of, e.g., rubber for supporting the lower surface of the optical data storage medium. The rotor magnet 10 which is a permanent magnet is arranged at the inner peripheral surface of the peripheral wall 12 of the turntable 6.

The chucking device 7 preferably includes, as shown in FIG. 1, a center case 18 having a substantially cylindrical shape, an axis adjusting claw 19, and a claw member 20. A plurality of axis adjusting claws 19 are integrally formed with the center case 18. The claw members 20 hold the optical data storage medium. The three axis adjusting claws 19 and the three claw members 20 are preferably disposed at equal intervals along the outer circumference of the center case 18. The claw members 20 are urged radially outward at all times by coil springs 22 disposed in the center case 18. The optical data storage medium is arranged with an axial through hole as an attachment hole at the center, and the optical data storage medium is removably loaded on the turntable 6 by fitting the center case 18 through the attachment hole from above.

The shaft 8 is made of, e.g., stainless steel with good abrasion resistance. The shaft 8 is preferably inserted into the shaft fixing portion 15 of the turntable 6. That is, the shaft 8 is fixed integrally with the turntable 6 with its lower side protruding downward. The shaft 8 is fixed with the axes J of the turntable 6 and of the chucking device 7 aligned with each other. The shaft 8 thus becomes the rotational axis of the rotor R. It should be noted that in the present preferred embodiment, the turntable 6 and the shaft 8 preferably are arranged as separate members; however, these components may be arranged as a single member. In addition, instead of being directly fixed to the turntable 6, the shaft 8 may be fixed indirectly to the turntable 6 with a separate member interposed therebetween.

The bearing portion 1 is preferably formed of a porous sintered compact having a hollow cylindrical shape. The bearing portion 1 is sufficiently impregnated with lubricant oil.

The housing 2 has a substantially cylindrical tubular portion 23 and a stationary base 24. The stationary base 24 extends radially outward at the axially lower side of the tubular portion 23.

The tubular portion 23 is preferably arranged with a through hole 30 in an axially penetrating manner. The bearing portion 1 is fixed in the through hole 30, on the inner surface of the tubular portion 23.

The retaining claw 31 is formed integrally with the tubular portion 23 so as to protrude radially outward from the upper outer surface of the tubular portion 23. The retaining claw 31 has a slanted surface 33 and a perpendicular surface 34 (see FIGS. 7A-7C). The slanted surface 33 slants axially downward to the radially outer side, and the perpendicular surface 34 extends from the lower end of the slanted surface 33 to the radially inner side. The perpendicular surface 34 extends substantially perpendicular to the axial direction. The retaining claw 31 is arranged in a circularly closing manner along the circumferential direction. That is, the slanted surface 33 and the perpendicular surface 34 are arranged along the circumferential direction in a closing manner to have an annular shape.

An upper end portion of the tubular portion 23 where at least the retaining claw 31 is arranged is partially housed in the cylindrical portion 14 of the turntable 6 in the state where the turntable 6 is mounted on the housing 2. The upper side of the slanted surface 33 is also housed in the cylindrical portion 14. The slanted surface 33 extends axially downward such that the lower side of the slanted surface 33 is situated axially below the lower surface of the lid portion 11 extending radially outward from the cylindrical portion 14. That is, the slanted surface 33 is designed to be as long as possible along the axial direction.

The upper surface of the upper end portion on the tubular portion 23 is set in substantially the same axial position as the upper end surface of the bearing portion 1. The upper surface of the upper end portion on the tubular portion 23 may be defined at an axially higher level than the upper end surface of the bearing portion 1. This structure makes it possible to minimize the lubricant oil in the bearing portion 1 from leaking radially outward from the tubular portion 23. Moreover, since the bearing portion 1 is supported up to the upper end of its outer peripheral surface by the housing 2, it is possible to reduce run-out in the rotation of the shaft 8. Further, the upper end of the slanted surface 33 can be located in proximity to the top of the tubular portion 23, so that the slanted surface 33 can be designed to be as long as possible in the axial direction.

A bottom lid 35 is preferably fixed through adhesion or caulking to seal the lower opening of the tubular portion 23 of the housing 2. A substantially circular disk-shaped thrust plate 36 is disposed on the upper surface of the bottom lid 35 for receiving the lower end of the shaft 8. The attachment plate 38 is preferably fixed through adhesion or caulking to a portion at the outer periphery of the bottom surface of the stationary base 24. The attachment plate 38 covers the side below the turntable 6.

The stator 3 preferably includes a stator core 40 and coils 43. The stator core 40 has a substantially annular core back portion, and a plurality of teeth extending radially outward from the core back portion. The coils 43 are preferably formed of conductive windings around the teeth of the stator core 40. The stator 3 is fixed to the outer peripheral surface of the stationary base 24 of the housing 2. The stator 3 is disposed at a position radially separated by a small gap from the rotor magnet 10. The stator 3 generates a rotational magnetic field, which makes the rotor magnet 10 rotate integrally with the turntable 6 and the shaft 8.

The pressurizing magnet 4 formed of an annular permanent magnet is fixed on the axially upper side of the stator core 40. The pressurizing magnet 4 attracts the turntable 6 to the side of the housing 2, so that the rotation of the rotor R is stabilized. The pressurizing magnet 4 is disposed in close proximity to the lower surface of the lid portion 11 of the turntable 6 and coaxially with the rotational axis J of the rotor R.

Figure 3:
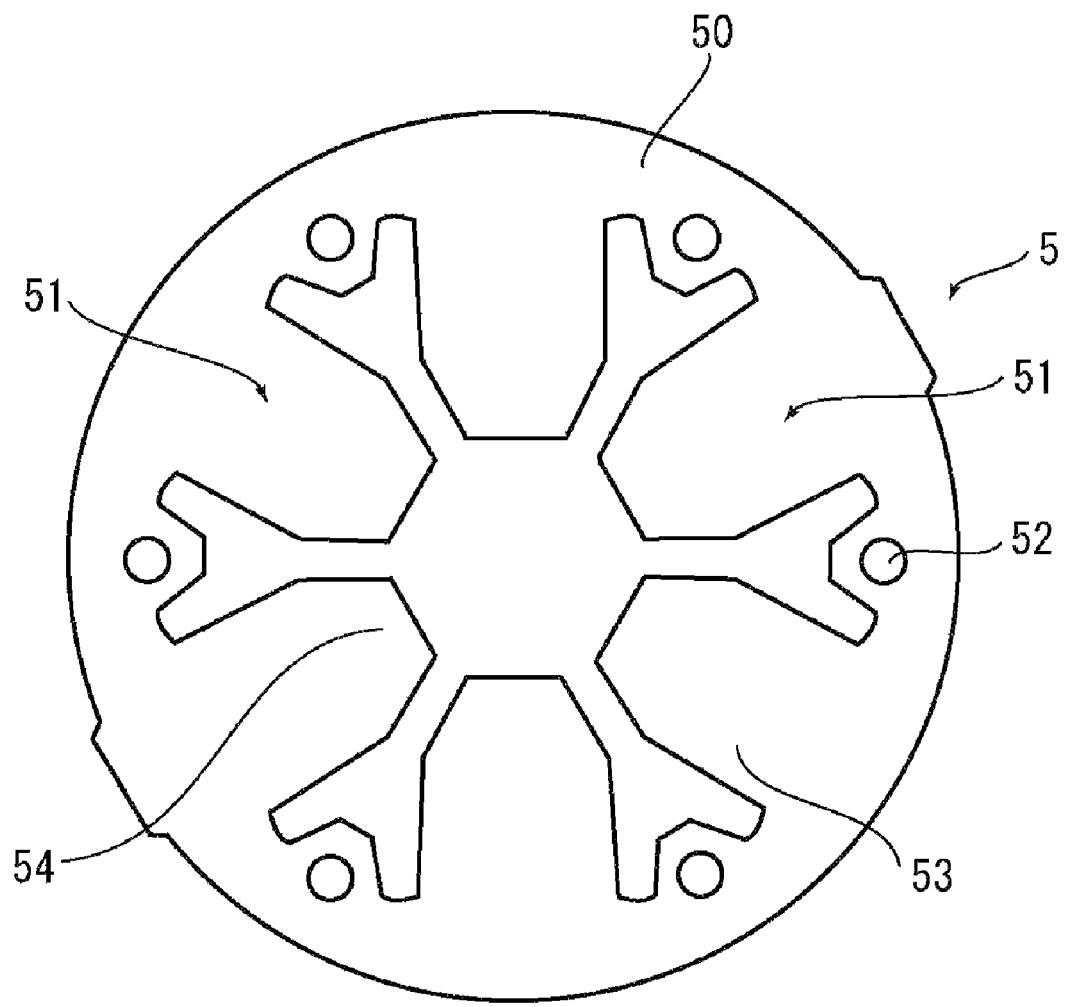
FIG. 3 is a schematic plan view of a retaining member before being bent, when viewed from the side.
Figure 4:
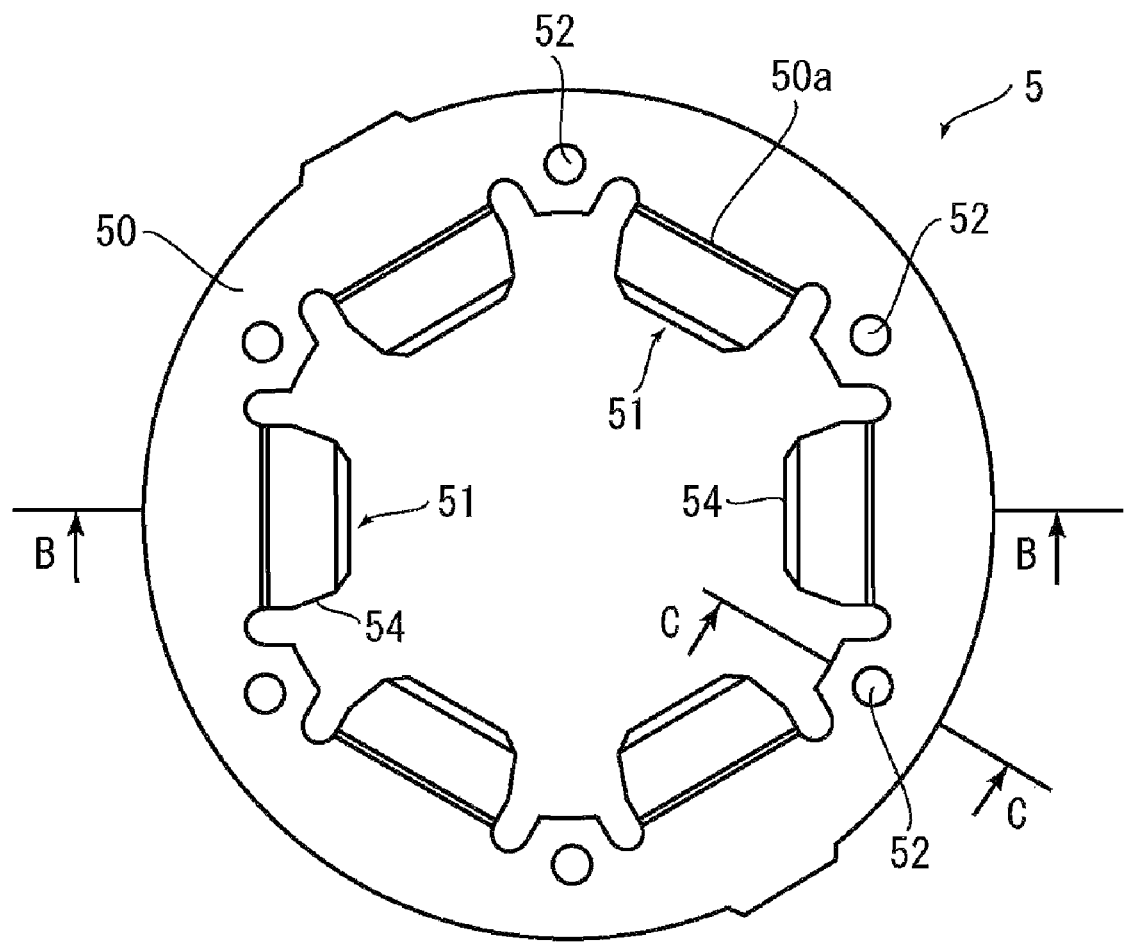
FIG. 4 is a schematic plan view of the retaining member after being bent, when viewed from the side.
Figure 5:
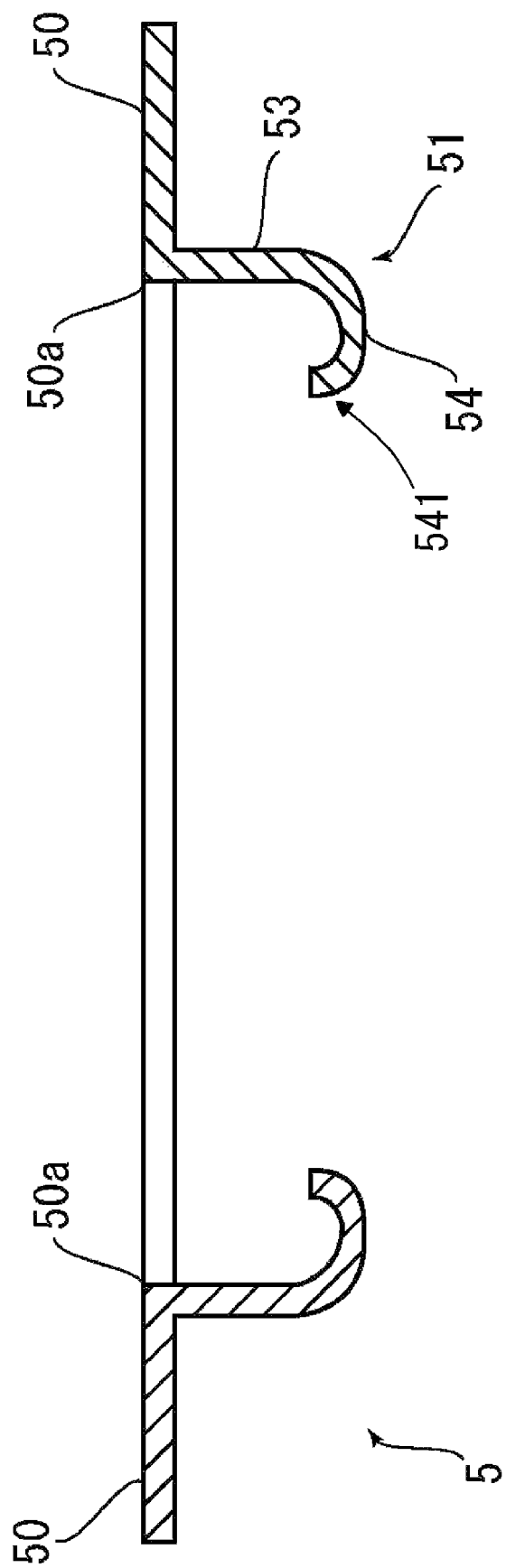
FIG. 5 is a cross-sectional view taken along the line B-B of FIG. 4.
Figure 6:
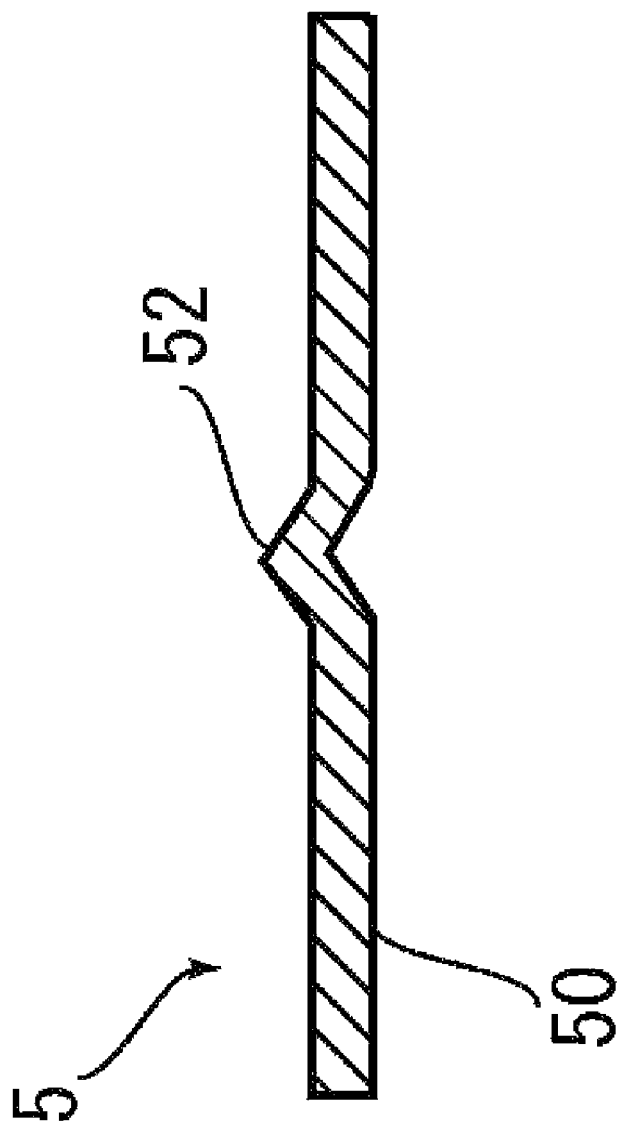
FIG. 6 is a cross-sectional view taken along the line C-C of FIG. 4.

The retaining member 5 is an integrally-formed product formed preferably by bending a thin metal sheet material with a spring property through press working. The retaining member 5 therefore is produced efficiently. The specific structure of the retaining member 5 will be described with reference to FIGS. 3 to 6. FIG. 3 shows the retaining member 5 before being bent, which is prepared by performing punching on a metal sheet. The retaining member 5 is formed into a predetermined shape by bending the sheet member shown in FIG. 3. FIGS. 4 to 6 show the retaining member after a press working is performed thereon, where FIG. 5 is a cross-sectional view taken along the line B-B of FIG. 4, and FIG. 6 is a cross-sectional view taken along the line C-C of FIG. 4.

As shown in FIGS. 3 and 4, the retaining member 5 has a substantially annular shape, and preferably includes a substantially annular attachment base 50 and a plurality of (six in the present preferred embodiment) retaining portions 51. The retaining portions 51 are arranged at constant intervals along the inner peripheral edge of the attachment base 50 and are bent at a substantially right angle relative to the attachment base 50. Note that the attachment base 50 and the retaining portions 51 are preferably formed in an integral manner.

As shown in FIGS. 4 and 6, a plurality of (six in the present preferred embodiment) projections 52 are arranged at constant intervals in between the adjacent retaining portions 51. The projections 52 are capable of being melted and become welding points for fixing the attachment base 50 to the lid portion 11 of the turntable 6. The projections 52 project in the opposite direction to the direction in which the retaining portions 51 are bent.

Each retaining portion 51 preferably includes an arm 53 and a catching portion 54. The arm 53 continues from the attachment base 50 and has elasticity. The catching portion 54 is preferably arranged at the lower end of each arm 53 and has its tip curved radially inward. The retaining portions 51 are preferably formed into a J shape in cross section. As shown in FIG. 3, the arms 53 are larger in circumferential width than the catching portions 54. The circumferential width of each catching portion 54 is gradually reduced toward the tip (i.e., the end of the catching portion 54 on the opposite side to the arm 53). By reducing the circumferential width of the catching portions 54, the area of contact with the retaining claw 31 can be reduced when the turntable 6 is mounted on the housing 2. Therefore, frictional resistance between the catching portions 54 and the retaining claw 31 can be reduced. Also, since the catching portions 54 are reduced in circumferential width toward the tips, the arms 53 can be elongated approximately up to the center of the retaining member 5, as shown in FIG. 3. Therefore, the arms 53 can easily be deformed elastically, so that it becomes possible to reduce the load applied to the turntable 6 during the mounting of the turntable 6.

In the catching portion 54 of each retaining portion 51, a contacting portion 541 to be in contact with the slanted surface 33 is arranged in a curved shape which is directed axially upward and slanted radially inward. This structure enables reduction in the area of contact between the slanted surface 33 and the contacting portions 541 of the catching portions 54. Further, the contact of the catching portions 54 with the slanted surface 33 makes it possible to effectively disperse radially outward the force applied from the slanted surface 33 to the contacting portions 541 of the catching portions 54. Accordingly, the arms 53 can be elastically deformed radially outward in an effective manner with the catching portions 54 contacting the slanted surface 33. As a result, the force for mounting the rotor R onto the housing 2 can be reduced.

The retaining member 5 is disposed such that the arms 53 are positioned in the vicinity of the lower end of the cylindrical portion 14, on the bottom surface of the lid portion 11, as shown in FIG. 2 and FIGS. 7A to 7C. More specifically, the retaining member 5 is attached to the lower surface of the turntable 6 such that each of the bent portions 50*a* at which the attachment base 50 joins with the retaining portions 51 is positioned at substantially an identical position with the radial position of the cylindrical portion 14 of the turntable 6, i.e., the position of the bent portion 14*a* continuing to the lower end of the cylindrical portion 14. That is, the arms 53 are substantially coincident in radial position with the cylindrical portion 14. The phrase "substantially identical" encompasses a case in which at least a portion of each bent portion 50*a* is located within the radial area from the joint position of the bent portion 14*a* of the cylindrical portion 14 with the lid portion 11 to the inner peripheral surface of the cylindrical portion 14. Also, the phrase "substantially coincident" encompasses a case in which at least a portion of each arm 53 is located within the radial area from the radial position of the inner peripheral surface to the radial position of the outer peripheral surface of the cylindrical portion 14. That is, the retaining member 5 is fixed at the inner peripheral edge of the lid portion 11 of the turntable 6. The term "inner peripheral edge of the lid portion 11" refers to an inner peripheral portion of the lid portion 11 that radially includes the bent portion 14*a*.

In this configuration, the load that is applied to the arms 53 of the retaining member 5 while the rotor R is being mounted onto the housing 2 is easily transmitted to the bent portion 14*a* which is improved in rigidity, rather than to the easily deformable lid portion 11 of the turntable 6. Therefore, the deformation of the turntable 6 can be effectively minimized.

In the state where the retaining member 5 is fixed on the turntable 6, the arms 53 protrude axially downward with at least the tip of each catching portion 54 projecting into the radially inner side of the cylindrical portion 14. The catching portions 54 contact the retaining claw 31 while the rotor R is being mounted onto the housing 2 (see FIGS. 7A to 7C).

The retaining member 5 is preferably fixed on the lower surface of the turntable 6 through projection welding. That is, with the tips of the projections 52 on the attachment base 50 in contact with the lower surface of the lid portion 11 of the turntable 6, electric current is applied to heat the contact areas, so that the tips of the projections 52 are fused. Then, the projections 52 and the lower surface of the lid portion 11 are pressed to each other to be fixed. The projections 52 are arranged such that the positions of the welds can be recognized clearly. Additionally, the area of contact between the lid portion 11 and the attachment base 50 is small, and so the area to be welded becomes small as well. Accordingly, the deformation of the turntable 6 due to heat fusing can be effectively avoided by this fixing method, coupled with the fact that the attachment base 50 is fixed in the vicinity of the bent portion 14*a* which is structurally enhanced in rigidity.

The thickness of the retaining member 5 is preferably sufficiently smaller than the thickness of the turntable 6. Specifically, the thickness of the retaining member 5 is preferably equal to or smaller than half the thickness of the lid portion 11 of the turntable 6. By arranging a sufficient difference between the thicknesses of the turntable 6 and of the retaining member 5 by taking advantage of the difference in materials with respect to the presence or absence of a spring property, the retaining member 5, which has a spring property and a smaller thickness, is elastically deformed first in mounting the rotor R onto the housing 2, to attenuate the impact of load applied to the turntable 6. Also, in welding the retaining member 5 to the lower surface of the lid portion 11, the small thickness of the retaining member 5 provides an advantage that the projections 52 are easily melted. In the present preferred embodiment, the thickness of the turntable 6 is approximately 0.4 mm, and the thickness of the retaining member 5 is approximately 0.12 mm, for example.

Figure 7A:
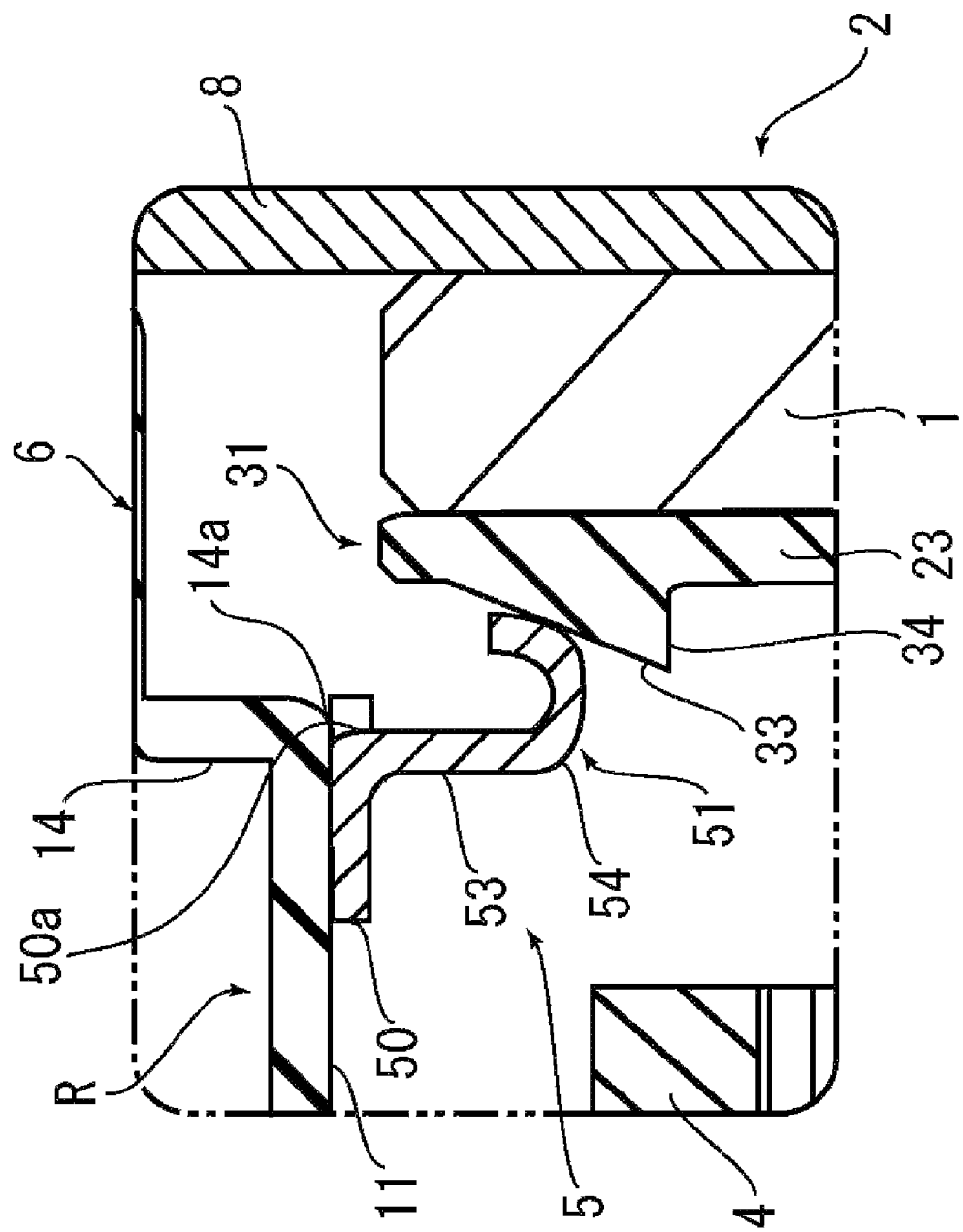
FIG. 7A is a schematic view of a rotor retaining mechanism according to a preferred embodiment of the present invention showing a positional relationship between the retaining member and a housing at the start of the mounting of a rotor to the housing.

The retaining mechanism for the rotor R including the retaining member 5 according to the present preferred embodiment of the present invention will be described next with reference to FIGS. 7A to 7C. The retaining mechanism includes the retaining member 5, and the retaining claw 31 arranged on the housing 2. The catching portions 54 of the retaining member 5 and the retaining claw 31 not only facilitate the mounting of the rotor R onto the housing 2, but also prevent the rotor R from coming off the housing 2.

The rotor R is mounted onto the housing 2 in such a manner that the turntable 6, the chucking device 7, the rotor magnet 10, the retaining member 5, and the like are fitted onto the rotor R, and then the shaft 8 of the rotor R is inserted into the bearing portion 1 of the housing 2 fitted with the pressurizing magnet 4, the stator 3, and the like.

The rotational axis of the rotor R is aligned approximately with the rotational axis of the housing 2, and the rotor R is positioned over the housing 2. As the rotor R is moved downward, each catching portion 54 of the retaining member 5 comes into contact with the slanted surface 33 of the retaining claw 31 on the housing 2, as shown in FIG. 7A. The radial dimensional difference between the arms 53 of the retaining member 5 and the slanted surface 33 of the retaining claw 31 is larger than that between the shaft 8 and the bearing portion 1; therefore, it is easily obviated that the arms 53 contact the slanted surface 33. Even if not adjusted precisely, the axes of the rotor R and of the housing 2 come to be coincident with each other as the shaft 8 is inserted into the bearing portion 1.

Figure 7B:
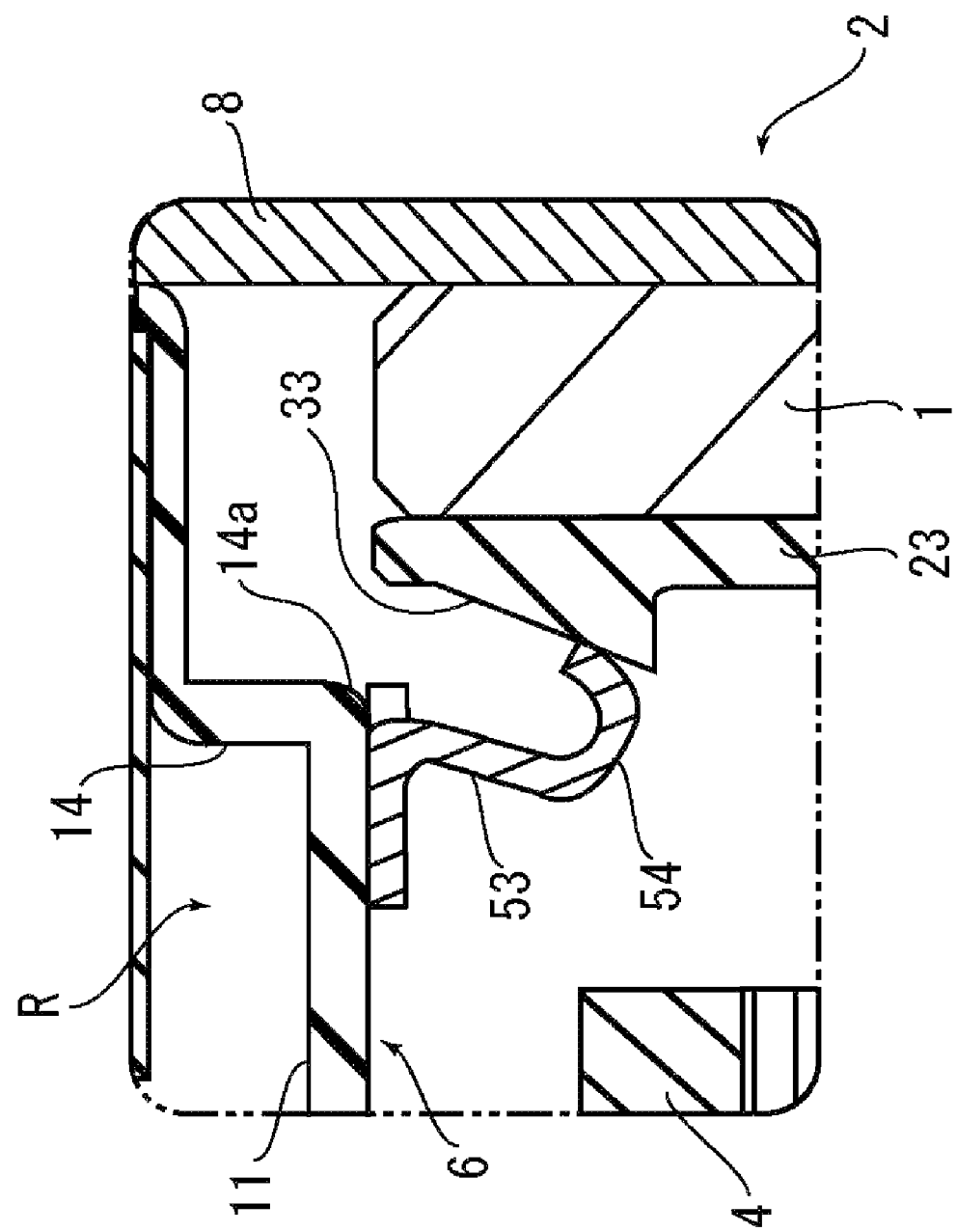
FIG. 7B is a schematic view of the rotor retaining mechanism according to a preferred embodiment of the present invention showing a positional relationship between the retaining member and the housing in the middle of the mounting of the rotor to the housing.

Then, as shown in FIG. 7B, while the rotor R is pushed toward the housing 2 to insert the shaft 8 into the bearing portion 1, each catching portion 54 is guided along the slanted surface 33 as each arm 53 of the retaining member 5 elastically deforms radially outward. At this point, the load applied to the retaining member 5 is transmitted to the turntable 6 through the arms 53. However, because the arms 53 are attached in the vicinity of the lower end of the cylindrical portion 14 which is structurally improved in rigidity (i.e., the inner peripheral edge of the lid portion 11), the deformation of the lid portion 11 of the turntable 6 can effectively be minimized.

Moreover, with the bent portions 50a of the arms 53 and the bent portion 14a of the turntable 6 being positioned substantially identical with each other and the bent portions 50a and the bent portion 14a intimately attached to each other, even if the arms 53 slant to the radially inner side in the axially downward direction, necessitating a larger load to be applied for the elastic deformation, such a load is transmitted to the cylindrical portion 14 and/or the bent portion 14a that are structurally improved in rigidity, whereby the deformation of the turntable 6 is effectively minimized.

The slanted surface 33 of the retaining claw 31 has a relatively long dimension in the axial direction, thereby reducing the angle of inclination (i.e., the sharp angle made by the rotational axis J and the slanted surface 33). Therefore, while the duration of contact between the slanted surface 33 and the catching portions 54 is increased, it becomes possible to reduce the maximum instantaneous load to be applied to the turntable 6. Consequently, the abrupt impact to be applied to the turntable 6 can be attenuated, so that the deformation of the turntable 6 can effectively be minimized. Further, since the catching portions 54 are reduced in circumferential width toward the tips, the area of contact between the retaining claw 31 and the catching portions 54 is decreased. As a result, it is possible to reduce the frictional resistance between the retaining claw 31 and the catching portions 54. Moreover, the inner diameter of the cylindrical portion 14 of the turntable 6 can be reduced in accordance with the reduced angle of inclination of the slanted surface 33. It is therefore possible to take a larger space in the radial direction for disposing the claw members 20 and the coil springs 22 of the chucking device 7. This imparts increased flexibility in designing the claw members 20 and the coil springs 22 of the chucking device 7.

Figure 7C:
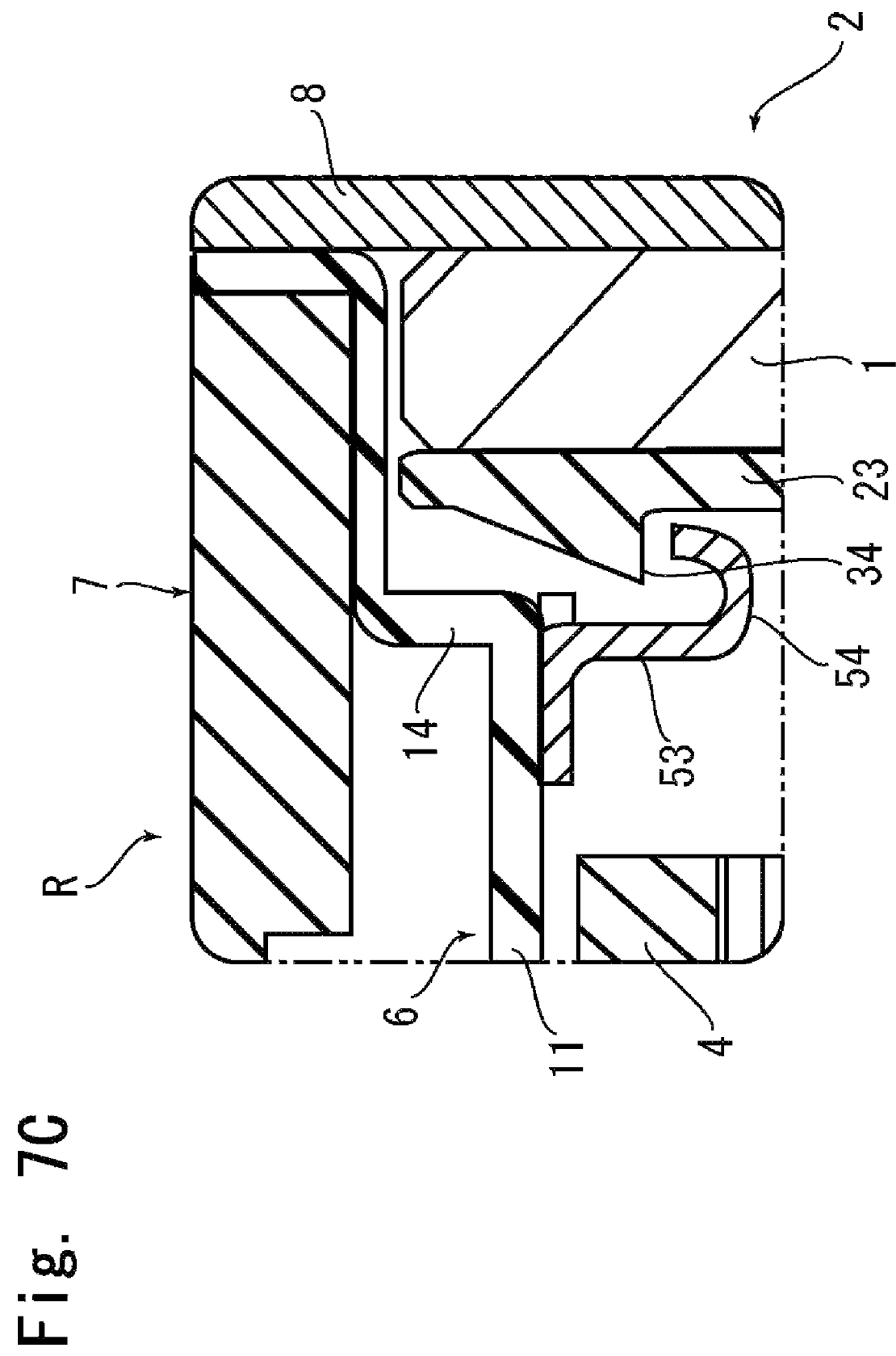
FIG. 7C is a schematic view of the rotor retaining mechanism according to a preferred embodiment of the present invention showing a positional relationship between the retaining member and the housing when the mounting of the rotor to the housing is completed.

Next, as shown in FIG. 7C, when the rotor R is further pushed onto the housing 2, each catching portion 54 is moved axially downward beyond the lower end of the slanted surface 33. That is, the catching portions 54 move into an area axially under the perpendicular surface 34. As a result, the arms 53 that have been elastically deformed return to the original state prior to the elastic deformation, and thus the rotor R is mounted on the housing 2.

Once the rotor R is mounted on the housing 2, the retaining member 5 and the retaining claw 31 are held in a non-contacting state during normal operation. When an external impact is applied to the rotor R, or at the time of removal of the data storage medium, a load may be applied in the direction of coming off (i.e., substantially in the axially upward direction) with the turntable 6 lifted from the housing 2. In this case, the catching portions 54 of the retaining member 5 contact the perpendicular surface 34 of the retaining claw 31, whereby the rotor R is prevented from coming off the housing 2.

Data Storage Medium Drive

Figure 8:
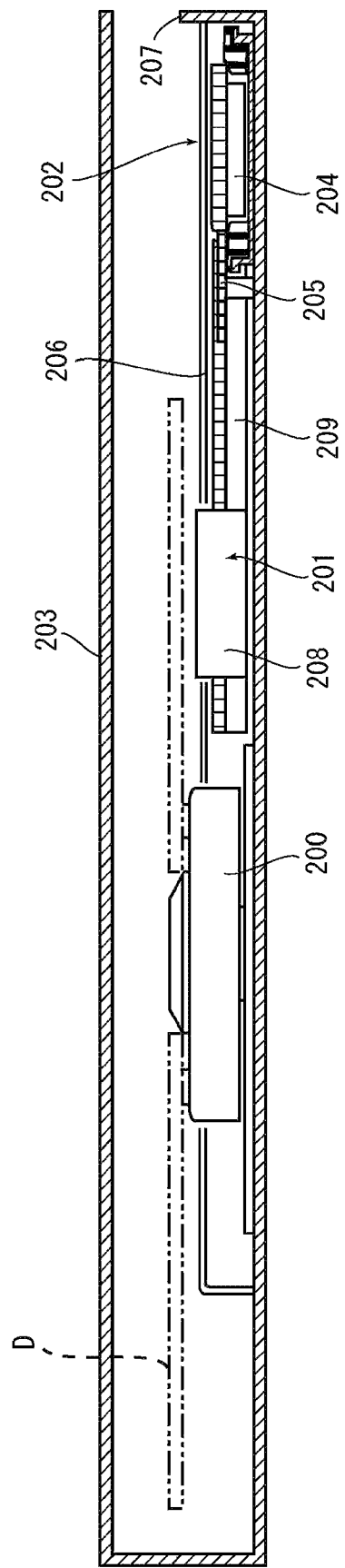
FIG. 8 is a schematic cross-sectional view of a data storage medium drive mounted with the motor according to a preferred embodiment of the present invention taken along an axial direction.

A preferred embodiment of a data storage medium drive mounted with a motor according to a preferred embodiment of the present invention will be described with reference to FIG. 8. FIG. 8 is a schematic cross-sectional view of the data storage medium drive taken along the axial direction. The height of the data storage medium drive according to the present preferred embodiment of the present invention is, for example, approximately 7 mm.

As shown in FIG. 8, the data storage medium drive preferably includes a spindle motor 200, a pickup mechanism 201, a moving mechanism 202, and a case 203. The spindle motor 200 allows a data storage medium D to be removably loaded thereon, and rotates the data storage medium D. The pickup mechanism 201 emits and receives light to and from the lower surface of the data storage medium D. The moving mechanism 202 moves the pickup mechanism 201 in a reciprocating manner along the radial direction of the data storage medium D. The case 203 contains all these components.

The moving mechanism 202 preferably includes a motor 204, and a gear 205 for transmitting the rotary torque of the motor 204.

A partitioning member 206 is disposed inside the case 203 for separating the data storage medium D from the moving mechanism 202. A data storage medium entrance 207 is arranged in the case 203 for the insertion and removal of the data storage medium D.

The pickup mechanism 201 preferably includes a pickup portion 208 and a moving portion 209. The pickup portion 208 emits and receives light. The moving portion 209 engages with the gear 205. The moving portion 209 is reciprocated in the radial direction through the gear 205 that is rotatably driven by the motor 204. In accordance with the movement of the moving portion 209, the pickup portion 208 is reciprocated in the radial direction.

By using the motor according to various preferred embodiments of the present invention as the spindle motor 200 to be mounted in the data storage medium drive, the data storage medium drive can be reduced in thickness.

Although preferred embodiments of the motor have been described herein, it should be noted that the present invention is not limited by the above-described preferred embodiments, and that various changes and modifications can be made within the scope defined by the appended claims.

For example, six retaining portions 51 in the retaining member 5 are preferably provided according to a preferred embodiment of the present invention, but the present invention is not limited thereto. For example, only three retaining portions can be arranged in the retaining member.

In addition, an annular recess that is depressed axially upward may be arranged in the perpendicular surface 34 of the retaining claw 31, for example. By housing the tips of the catching portions 54 in this recess, the slanted surface 33 can be further elongated.

Further, the cylindrical portion 14 of the turntable 6 according to the foregoing preferred embodiments preferably has a substantially cylindrical shape with a substantially uniform inner diameter along the axial direction, for example. The present invention, however, is not limited thereto. The substantially cylindrical portion of the turntable may be formed into a substantially conical shape having a trapezoidal cross section with reduced inner diameter in the axially upward direction.

Moreover, according to the foregoing preferred embodiments, the circumferential width of the arms 53 in the retaining member 5 is substantially uniform toward the catching portions 54, for example. The present invention, however, is not limited thereto. The circumferential width of the arms 53 may be gradually reduced toward the catching portions 54.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
   a rotor including a shaft defining a rotational axis, a rotor magnet rotating along with the shaft, and a turntable retaining the rotor magnet;
   a bearing portion having a substantially cylindrical shape arranged to rotatably support the shaft; and
   a housing including a tubular portion including an inner surface retaining the bearing portion; wherein
   the tubular portion of the housing includes a retaining claw protruding radially outward from an outer surface of the tubular portion;
   the turntable includes:
   a lid portion having a substantially circular disk shape;
   a substantially cylindrical portion arranged integrally with an inner peripheral edge of the lid portion; and
   a retaining member arranged at a bottom surface and the inner peripheral edge of the lid portion and arranged to make contact with the retaining claw so as to prevent the turntable from coming off of the housing in an axial direction, wherein the retaining member includes:
   an attachment base having a substantially annular shape arranged at the bottom surface of the lid portion; and
   a plurality of retaining portions formed integrally with the attachment base, wherein each retaining portion includes:
   an arm protruding axially downward; and
   a catching portion arranged at a lower side of the arm to make contact with the retaining claw so as to prevent the turntable from coming off of the housing;
   the substantially cylindrical portion includes an annular surface extending radially outward from the shaft to the inner peripheral edge; and
   the retaining claw is arranged radially inward of the lid portion and includes a slanted surface arranged to slant axially downward to a radially outward side and, when mounting the rotor to the housing, the slanted surface is positioned below the annular surface and extended from an area axially above the lid portion to an area axially below a bottom surface of the lid portion so that the retaining claw contacts the catching portion.

2. The motor according to claim 1, wherein a radial position of the arm is substantially coincident with a radial position of the substantially cylindrical portion of the turntable.

3. The motor according to claim 1, wherein an upper end surface of the tubular portion is located at an axial position substantially the same as or above an upper end surface of the bearing portion.

4. The motor according to claim 1, wherein a circumferential width of the arm is greater than a circumferential width of the catching portion.

5. The motor according to claim 4, wherein the circumferential width of the arm is gradually reduced toward the catching portion.

6. The motor according to claim 1, wherein the catching portion includes a contacting portion which is directed axially upward and slants radially inward, and when mounting the rotor to the housing, arranged to contact the retaining claw.

7. The motor according to claim 1, wherein the retaining member is an integral metal sheet material having a spring property.

8. The motor according to claim 7, wherein a radial position where the attachment base joins with the retaining portion is substantially identical to a radial position of the inner peripheral edge of the lid portion.

9. The motor according to claim 7, wherein the turntable is made of an integral metal sheet material, and an axial thickness of the retaining member is equal to or smaller than half the thickness of the lid portion of the turntable.

10. The motor according to claim 7, wherein the attachment base of the retaining member includes a plurality of projections, and the attachment base is fixed to the lid portion via the projections.

11. The motor according to claim 9, wherein a surface of the turntable is covered with a nitride layer.

12. The motor according to claim 1, wherein a data storage medium supporting member is arranged at an outer peripheral edge of the lid portion to support a data storage medium having a substantially discoid shape, and a chucking device is arranged radially inwardly of the data storage medium supporting member to detachably retain the data storage medium.

13. A data storage medium drive comprising:
   the motor according to claim 12;
   a pickup mechanism arranged to emit and receive light to and from the data storage medium; and a moving mechanism arranged to move the pickup mechanism in a reciprocating manner along a radial direction of the data storage medium.

14. A motor comprising:

a rotor including a shaft defining a rotational axis, a rotor magnet rotating along with the shaft, and a turntable retaining the rotor magnet;

a bearing portion having a substantially cylindrical shape arranged to rotatably support the shaft; and a housing including a tubular portion including an inner surface retaining the bearing portion; wherein the tubular portion of the housing includes a retaining claw protruding radially outward from an upper outer surface of the tubular portion, the tubular portion includes:

a lid portion having a substantially circular disk shape; and a substantially cylindrical portion arranged integrally with and axially upward from an inner peripheral edge of the lid portion, the substantially cylindrical portion including an annular surface extending radially outward from the shaft to the inner peripheral edge; and a retaining member arranged at a bottom surface of the lid portion, the retaining member arranged to make contact with the retaining claw so as to prevent the turntable from coming off of the housing in an axial direction; and the retaining claw is arranged radially inward of the lid portion and includes a slanted surface slanted axially downward to a radially outer side and, when mounting the rotor to the housing, the slanted surface is positioned below the annular surface and extended from an area axially above the lid portion to an area axially below the bottom surface of the lid portion so that the retaining claw contacts the catching portion.

15. The motor according to claim 14, wherein an upper end surface of the tubular portion is located at an axial position substantially the same as or above an upper end surface of the bearing portion.

16. The motor according to claim 14, wherein a data storage medium supporting member is arranged at an outer peripheral edge of the lid portion to support a data storage medium having a substantially discoid shape, and a chucking device is arranged radially inwardly of the data storage medium supporting member to detachably retain the data storage medium.

17. A data storage medium drive comprising:

the motor according to claim 16;

a pickup mechanism arranged to emit and receive light to and from the data storage medium; and a moving mechanism arranged to move the pickup mechanism in a reciprocating manner along a radial direction of the data storage medium.

* * * * *